Patented July 20, 1926.

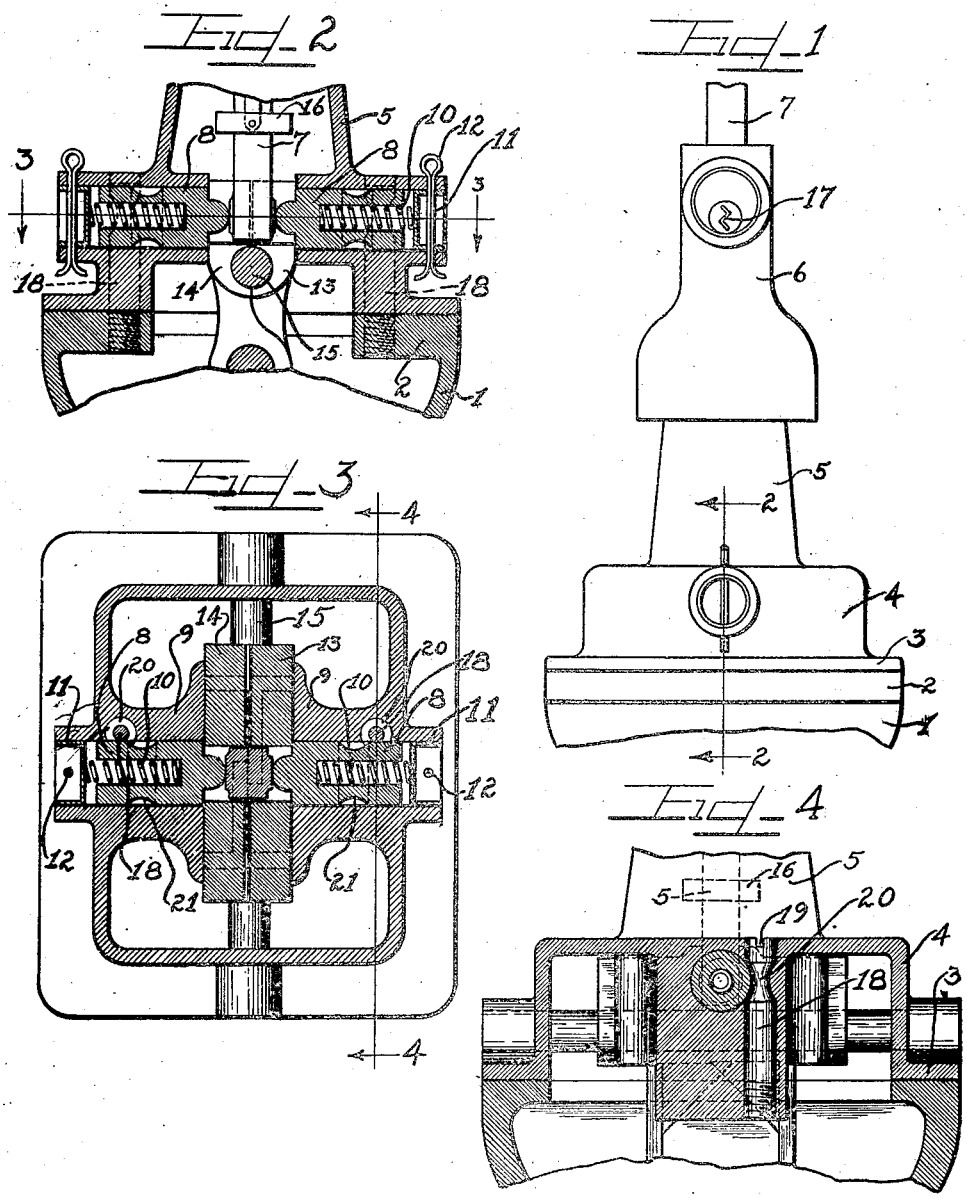

1,593,410

UNITED STATES PATENT OFFICE.

COLVIN L. JOHNSON, OF ST. LOUIS, MISSOURI, ASSIGNOR TO JOHNSON AUTOMOBILE LOCK CO., A CORPORATION OF ILLINOIS.

TRANSMISSION-HOUSING COVER-LOCKING MEANS.

Application filed July 25, 1922. Serial No. 577,279.

In order to prevent the theft or unauthorized use of motor vehicles and other gear-operated mechanism, it is customary in many cases to lock the transmission gears thereof in a neutral or inoperative position by locking means which are associated with the gear shift lever or other gear shifting device. While such locking means are highly successful in attaining their desired purpose, it is nevertheless possible in certain cases to remove the transmission housing cover and gear locking means, after which the gears may be shifted into operative position and the vehicle or other mechanism operated.

It is therefore an important object of the present invention to provide cover locking means which are associated with the gear shift lever interlocking or retaining means. Other and further important objects of the present invention will be apparent from the disclosures in the specification and the accompanying drawings.

The invention (in a preferred form) is shown on the drawings and hereinafter more fully described.

On the drawings:

Figure 1 is a fragmentary elevation showing a gear shift lever and transmission housing cover adapted to be locked by the improved means of this invention.

Figure 2 is a slightly enlarged fragmentary section on the line 2—2 of Figure 1, with parts in elevation.

Figure 3 is a section on the line 3—3 of Fig. 2.

Figure 4 is a slightly enlarged fragmentary section on the line 4—4 of Figure 3.

As shown on the drawings:

The reference numeral 1 indicates a transmission housing which is inwardly flanged at 2 and which has mounted therein the usual transmission gears (not shown). Seated on the flange 2 is a flanged cover member 3 which is provided with an upwardly extending recessed central portion 4 having a dome portion 5 on which a gear shift lever 6 is supported. A depending portion 7 of said gear shift lever 6 extends downwardly through the dome portion 5 and the lower end thereof is normally engaged between the rounded ends of plungers 8 which are slidably mounted in inwardly extending boses 9 formed in the portion 4 and which are normally impelled inwardly by means of coil springs 10 which are engaged in recesses in said plungers 8 and the outer ends of which abut retaining cups or plates 11 which are secured in the outer ends of the passages in which said plungers 8 are mounted by means of cotter pins 12 or in any other suitable manner. Said plungers 8 afford interlocking or retaining means for the lower end 7 of the gear shift lever which is adapted to selectively engage shifting forks 13 and 14 slidably mounted on or slidable with a rod 15 extending longitudinally of the casing. Said shifting forks 13 and 14 extend into the interior of the housing or casing 1, and when actuated by the lever act to shift the gears in the usual and well known manner.

It is, of course, apparent that when the lower end 7 of the lever is shifted laterally to selectively engage one of the forks 13 or 14, the plunger 8 adjacent thereto will be moved inwardly, and that the plunger 8 on the opposite side thereof will, on account of the action of the springs, be engaged in the space in the other fork, thus preventing accidental shifting thereof.

A suitable locking mechanism 16 which is adapted to be engaged between the inner ends of the bosses 9 to prevent lateral movement of the lower end 7 of the lever is provided, said locking mechanism 16 adapted to be locked in any suitable manner, as, for example, by a locking mechanism 17, which is mounted in the lever 6. Means which are provided for locking the cover 3 on the casing 2 comprises pins 18 which are engaged through apertures formed in the bosses 9 adjacent the passages in which the plungers 8 are mounted and which are engaged in threaded apertures in the flange 2, said pins being preferably provided with tool receiving slots 19 in the head thereof to facilitate the engagement thereof in said threaded apertures.

As clearly shown in the Figures 3 and 4, said pins 18 are so positioned that the outer surfaces thereof intersect the outer surfaces of the plungers 8 and to provide for free sliding movement of the plungers said pins 18 are cut away as indicated at 20. This permits sliding movement of the plungers, but of course prevents the removal of the pins 18, except when peripheral grooves 21 in the plungers 8 are brought into register therewith, and, in view of the fact that said plungers 8 cannot be moved into position to effect such a registration of the grooves 21 with the pins 18 when the lever is locked from lateral movement, it will be apparent that the cover 3 is locked against removal from the casing at all times when the gear shift lever is locked from movement.

It will be seen from the foregoing description that this invention provides transmission housing cover locking means which are particularly adapted for use in connection with that type of transmission housing cover wherein lever-retaining or interlocking means are provided.

I am aware that numerous details of construction may be varied through a wide range without departing from the principles of this invention, and I therefore do not purpose limiting the patent granted hereon otherwise than necessitated by the prior art.

I claim as my invention:

The combination with a transmission housing, of a cover for the housing, a gear shift lever pivotally supported in the housing, a pair of oppositely disposed spring pressed detent members slidably mounted in said cover, pins extending through said cover and normally in locking relation with said detent members, said pins extending through said cover and engaging said housing for locking said cover thereto, said detent members being adapted to be actuated upon the actuation of said lever for permitting the removal of said pins, and means for locking said lever against movement.

In testimony whereof I have hereunto subscribed my name.

COLVIN L. JOHNSON.